United States Patent
Choi et al.

(10) Patent No.: US 10,186,874 B2
(45) Date of Patent: Jan. 22, 2019

(54) PREDICTING HIGH-VOLTAGE DIRECT CURRENT TRANSMISSION IN A WIND TURBINE SYSTEM

(71) Applicant: LSIS CO., LTD., Anyang-si, Gyeonggi-do (KR)

(72) Inventors: Yong Kil Choi, Gunpo-si (KR); Ho Seok Choi, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 347 days.

(21) Appl. No.: 14/703,529

(22) Filed: May 4, 2015

(65) Prior Publication Data
US 2015/0333525 A1    Nov. 19, 2015

(30) Foreign Application Priority Data

May 13, 2014 (KR) ........................ 10-2014-0057372

(51) Int. Cl.
*H02J 4/00* (2006.01)
*G05B 15/02* (2006.01)
(Continued)

(52) U.S. Cl.
CPC ................ *H02J 4/00* (2013.01); *G05B 15/02* (2013.01); *H02J 3/28* (2013.01); *H02J 3/36* (2013.01);
(Continued)

(58) Field of Classification Search
CPC ........ H02J 4/00; H02J 3/36; H02J 3/28; H02J 3/386; H02J 2003/007; G05B 15/02;
(Continued)

(56) References Cited

U.S. PATENT DOCUMENTS 9,077,204 B2 *  7/2015  More ..................... F03D 7/0284
9,746,861 B2 *  8/2017  Perier ....................... G05F 1/46
(Continued)

FOREIGN PATENT DOCUMENTS

CN    102801176    11/2012
EP      2528184    11/2012
(Continued)

OTHER PUBLICATIONS

Andreasson, M.; Nazari, M.; Dimarogonas, D.V.; Sandberg, H.; Johansson, K.H.; Ghandhari, M., "Distributed Voltage and Current Control of Multi-Terminal High-Voltage Direct Current Transmission Systems", Aug. 2014, Proceedings of the 19th World Congress, The Intl Fed. of Automatic Control.*
(Continued)

*Primary Examiner* — Mohammad Ali
*Assistant Examiner* — Kelvin Booker
(74) *Attorney, Agent, or Firm* — K&L Gates LLP (57) ABSTRACT

The present disclosure relates to a high-voltage direct current (HVDC) transmission system, and particularly, to an HVDC transmission system control device associated with a power generation energy system. An HVDC transmission system control device according to an embodiment includes a wind power generation amount predicting unit configured to receive energy generated by a wind power generation device for a predetermined time, and predict a wind power generation amount on the basis of the received energy, a possible power generation amount predicting unit configured to determine an amount of energy generated by the wind power generation device and a transmission capacity corresponding to the amount of energy, on the basis of the predicted wind power generation amount, and a control unit configured to output energy to a power transformation device on the basis of the amount of energy and the
(Continued)

transmission capacity predicted by the possible power generation amount predicting unit.

3 Claims, 6 Drawing Sheets

(51) Int. Cl.
| | |
|---|---|
| *H02J 3/38* | (2006.01) |
| *H02J 3/28* | (2006.01) |
| *H02J 3/36* | (2006.01) |
| *H02J 3/00* | (2006.01) |

(52) U.S. Cl.
CPC ......... *H02J 3/386* (2013.01); *H02J 2003/007* (2013.01); *Y02E 10/723* (2013.01); *Y02E 10/763* (2013.01); *Y02E 10/766* (2013.01); *Y02E 60/60* (2013.01); *Y02E 60/76* (2013.01); *Y02E 70/30* (2013.01); *Y04S 40/22* (2013.01)

(58) Field of Classification Search
CPC ....... Y02E 60/60; Y02E 70/30; Y02E 10/766; Y02E 10/723; Y02E 60/76; Y02E 10/763; Y04S 40/22
See application file for complete search history.

(56) References Cited

U.S. PATENT DOCUMENTS

| | | | |
|---|---|---|---|
| 2002/0103745 A1* | 8/2002 | Lof | G06Q 40/04 705/37 |
| 2004/0183307 A1* | 9/2004 | Yoshida | F03D 7/0204 290/44 |
| 2004/0186671 A1 | 9/2004 | Golder et al. | |
| 2007/0035135 A1* | 2/2007 | Yoshida | F03D 7/0284 290/44 |
| 2009/0295162 A1* | 12/2009 | Oohara | F03D 7/028 290/44 |
| 2010/0292852 A1* | 11/2010 | Gertmar | H02J 3/1842 700/287 |
| 2012/0038212 A1* | 2/2012 | Arata | H02J 3/32 307/46 |
| 2012/0080955 A1* | 4/2012 | Fishman | H01L 31/02021 307/82 |
| 2012/0144828 A1* | 6/2012 | Lazaris | H02J 3/383 60/641.1 |
| 2012/0150361 A1* | 6/2012 | Lazaris | H02J 3/382 700/297 |
| 2012/0150679 A1* | 6/2012 | Lazaris | G06Q 30/0605 705/26.2 |
| 2012/0173174 A1* | 7/2012 | Gaarder | G01R 31/086 702/58 |
| 2012/0187913 A1* | 7/2012 | Abe | H01M 10/44 320/134 |
| 2012/0265463 A1* | 10/2012 | Von Sengbusch | G01R 19/2513 702/64 |
| 2012/0300510 A1 | 11/2012 | Jensen et al. | |
| 2013/0184884 A1* | 7/2013 | More | F03D 7/0284 700/291 |
| 2013/0218355 A1* | 8/2013 | Lazaris | F03G 6/00 700/291 |
| 2013/0249300 A1* | 9/2013 | Fishman | H01L 31/02016 307/82 |
| 2014/0025214 A1* | 1/2014 | Ito | G05F 5/00 700/291 |
| 2014/0042747 A1* | 2/2014 | Hoshihira | H02J 7/0068 290/50 |
| 2014/0062424 A1* | 3/2014 | Larsen | H02J 3/386 322/24 |
| 2014/0103651 A1* | 4/2014 | Grinblat | H02P 9/48 290/44 |
| 2014/0132075 A1* | 5/2014 | Fishman | H02J 3/383 307/82 |
| 2014/0192567 A1* | 7/2014 | Balocco | H02M 7/04 363/40 |
| 2014/0279361 A1* | 9/2014 | Streeter | G06Q 40/04 705/37 |
| 2015/0131342 A1* | 5/2015 | Larsson | H02J 3/36 363/35 |

FOREIGN PATENT DOCUMENTS

| | | |
|---|---|---|
| JP | 2004532600 | 10/2004 |
| JP | 2011-229205 | 11/2011 |
| JP | 2012075224 | 4/2012 |
| JP | 2014-023376 | 2/2014 |

OTHER PUBLICATIONS

DM Energy, "Wind Turbine Grid Connection and Interaction", 2001, European Communities, Deutsches Windenergie-Institut GmbH.*
Jovcic, D., "Control of High Voltage DC and Flexible AC Transmission Systems", Dec. 1999, The University of Auckland.*
Sheng, L.W.; Razani, A.; Prabhakaran, N., "Control of High Voltage Direct Current (HVDC) Bridges for Power Transmission Systems", Dec. 2010, Proceedings of 2010 IEEE Student Conference on Research and Development.*
Shi, Z.; Wang, Z.; Liu, B.; Li, Y.; Tolbert, L.M. and Wang, F., "DC Impedance Modelling of a MMC-HVDC System for DC Voltage Ripple Prediction under a Single-Line-to-Ground Fault", 2014, IEEE.*
Siemens AG, "High Voltage Direct Current Transmission-Proven Technology for Power Exchange", 2011, Received from the Internet at "http://www.siemens.com/energy/hvdc".*
Siemens AG, Fact Sheet, High-Voltage Direct Current Transmission (HVDC), May 2014, Retrieved from the Internet at "http://www.siemens.com/press/x-win".*
Tang, G., He, Z. and Pang, H., "R&D and Application of Voltage Sourced Converter Based High Voltage Direct Current Engineering Technology in China", 2014, J. Mod. Power Syst. Clean Energy, 2(1):1-15.*
Zhu, J.; Booth, C.D.; Adam, G.P., Roscoe, A.J., "Coordinated Direct Current Matching Control Strategy for Multi-Terminal DC Transmission Systems with Integrated Wind Farms", Apr. 2014, Electric Power Systems Research, 124 (2015) 55-64.*
Zonetti, D.; Ortega, R.; Benchaib, A., "Modeling and Control of HVDC Transmission Systems From Theory to Practice and Back", Jun. 2015, Retrieved from the Internet at Elsevier Database.*
Glasdam, J. B.; Kocewiak, . H.; Hjerrild, J.; and Bak, C. L. (2015), "Control System interaction in the VSC-HVDC Grid Connected Offshore Wind Power Plant", Proceedings of the Cigré Symposium 2015 CIGRE. (Year: 2015).*
Liu, H., "Grid Integration of Offshore Wind Farms via VSC-HVDC—Dynamic Stability Study", 2014, Department of Energy Technology, Aalborg University. (Year: 2014).*
Lu, T., Feng, H., Cui, X.; Zhao, Z.; and Li, L., "Analysis of the Ionized Field Under HVDC Transmission Lines in the Presence of Wind Based on Upstream Finite Element Method", Aug. 2010, IEEE Transactions on Magnetics, vol. 46, No. 8. (Year: 2010).*
O'Donnell, R.J.; Schofield, N.; Smith, A.C.; and Cullent, J., "The Variable-Capacitance Machine for Off-shore Wind Generation", Apr. 2006, 3rd IET International Conference on Power Electronics, Machines and Drives—PEMD 2006. (Year: 2006).*
Kankanamalage, et al.,, "Usage of Storage for Optimal Exploitation of Transfer Capacity: A Predictive Control Approach," Power and Energy Society General Meeting, 2011 IEEE, XP032055430, Jul. 2011, 8 pages.
Kabouris, et al., "Application of Interruptible Contracts to Increase Wind-Power Penetration in Congested Areas," IEEE Transaction on Power Systems, vol. 19, No. 3, XP011115783, Aug. 2004, pp. 1642-1649.
European Patent Office Application Serial No. 15166166.7, Search Report dated Oct. 9, 2015, 12 pages.

(56) References Cited

OTHER PUBLICATIONS

Korean Intellectual Property Office Application Serial No. 10-2014-0057372, Office Action dated Nov. 12, 2015, 4 pages.
Japan Patent Office Application Serial No. 2015-098268, Office Action dated Jul. 19, 2016, 2 pages.
State Intellectual Property Office of the People's Republic of China Application Serial No. 201510323216.6, Office Action dated Mar. 3, 2017, 8 pages.

* cited by examiner

PREDICTING HIGH-VOLTAGE DIRECT CURRENT TRANSMISSION IN A WIND TURBINE SYSTEM

CROSS-REFERENCE TO RELATED APPLICATIONS

Pursuant to 35 U.S.C. § 119(a), this application claims the benefit of earlier filing date and right of priority to Korean Patent Application No. 10-2014-0057372, filed on May 13, 2014, the contents of which are all hereby incorporated by reference herein in its entirety.

BACKGROUND

The present disclosure relates to a high-voltage direct current (DC) transmission system, and particularly, to a high-voltage DC transmission system control device associated with a power generation energy system.

According to a wind power generation technology, wind (or wind power) is transformed into electric power using a wind turbine.

However, since various conditions for wind power generation, such as wind speed, are variable, the amount of electricity generated through the wind power generation is not constant, causing difficulty of using electric power.

Typically, to overcome such a limitation, an energy storage device is employed to cope with an output change of wind power generation, and power is supplied with a constant output.

However, according to such typical methods, system conditions such as a change of a wind power generation amount, a change of a demand for electric power, a change of an electric rate due to a demand change, and a change of the amount of use of reactive power are not considered. Therefore, although the stability of the system may be partially maintained, the power required by the system is unable to be stably supplied, and supply of power is unable to be optimized.

SUMMARY

Embodiments provide a high-voltage direct current (HVDC) transmission system for enabling efficient use of energy of a power system in which a wind power generation device is associated with a power storage device, and a method for controlling the same.

In one embodiment, an HVDC transmission system control device includes a wind power generation amount predicting unit configured to receive energy generated by a wind power generation device for a predetermined time, and predict a wind power generation amount on the basis of the received energy, a possible power generation amount predicting unit configured to determine an amount of energy generated by the wind power generation device and a transmission capacity corresponding to the amount of energy, on the basis of the predicted wind power generation amount, and a control unit configured to output energy to a power transformation device on the basis of the amount of energy and the transmission capacity predicted by the possible power generation amount predicting unit.

The details of one or more embodiments are set forth in the accompanying drawings and the description below. Other features will be apparent from the description and drawings, and from the claims.

DETAILED DESCRIPTION OF THE EMBODIMENTS

It should be understood that the terms used herein should not be construed as being limited to general or dictionary meanings, but should be interpreted based on the meanings and concepts corresponding to technical aspects of embodiments, considering that inventors may define terms appropriately to describe their inventions in the best ways.

Therefore, it should be understood that the embodiments described herein and the configurations illustrated in the drawings are merely preferred examples and do not entirely represent the technical aspects of the embodiments, and thus, various alternative equivalents or modifications could be made at the filing date.

Figure 1:
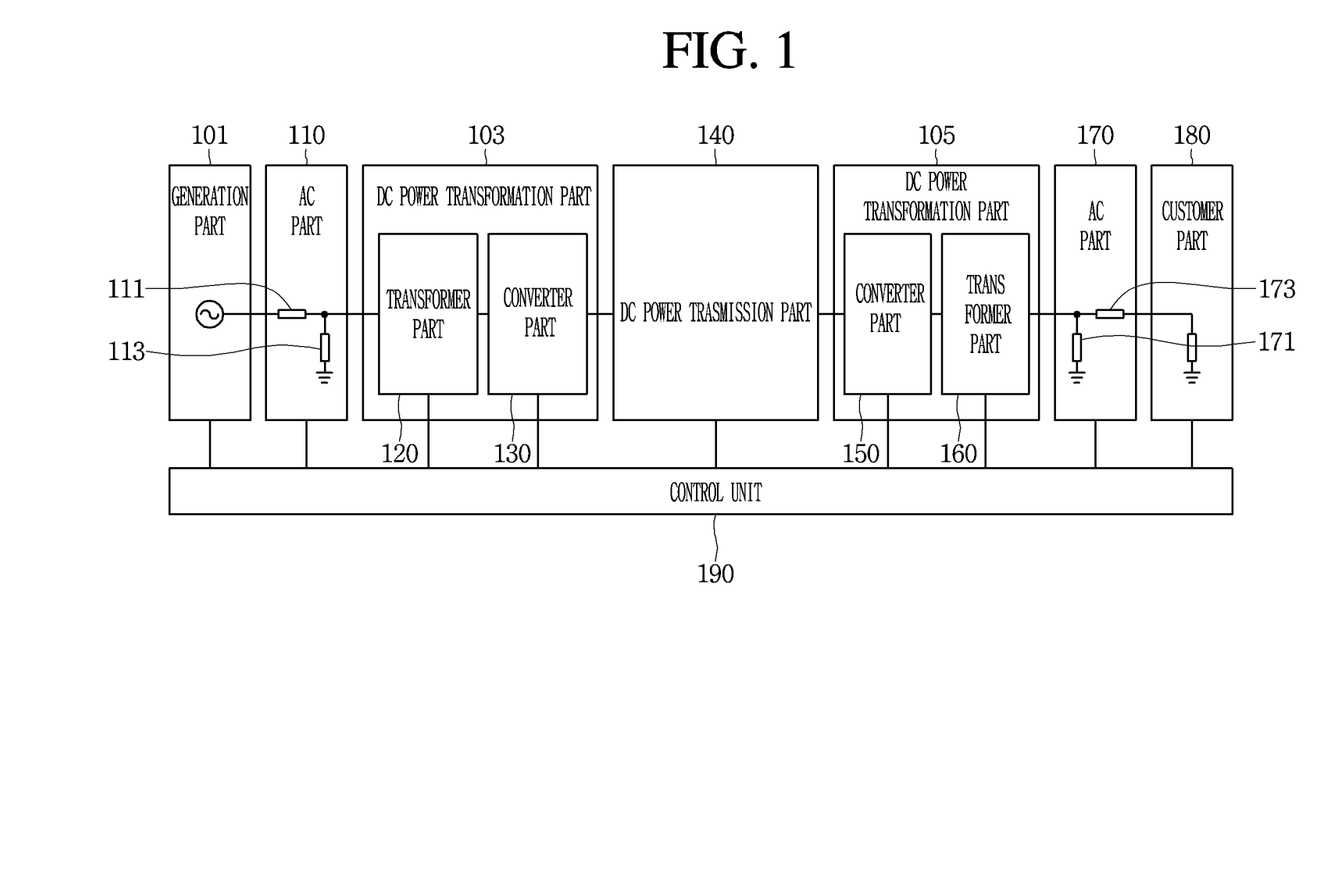
FIG. 1 is a block diagram illustrating a high-voltage direct current (HVDC) transmission system according to an embodiment.

FIG. 1 illustrates a high-voltage direct current (HVDC) transmission system according to an embodiment.

As illustrated in FIG. 1, an HVDC system 100 according to an embodiment 100 includes a power generation part 101, a transmission-side alternating current (AC) part 110, a transmission-side transformation part 103, a DC transmission part 140, a demand-side transformation part 105, a demand-side AC part 170, a demand part 180, and a control part 190. The transmission-side transformation part 103 includes a transmission-side transformer part 120 and a transmission-side AC-DC converter part 130. The demand-side transformation part 105 includes a demand-side DC-AC converter part 150 and a demand-side transformer part 160.

The power generation part 101 generates three-phase AC power. The power generation part 101 may include a plurality of power stations. The power generation part 101 according to an embodiment may generate power using wind power.

The transmission-side AC part 110 transfers the three-phase AC power generated by the power generation part 101 to a DC substation including the transmission-side transformer part 120 and the transmission-side AC-DC converter part 130.

The transmission-side transformer part 120 isolates the transmission-side AC part 110 from the transmission-side AC-DC converter part 130 and the DC transmission part 140.

The transmission-side AC-DC converter part 130 transforms three-phase AC power corresponding to an output of the transmission-side transformer part 120 into DC power.

The DC transmission part 140 transfers DC power of a transmission side to a demand side.

The demand-side DC-AC converter part 150 transforms DC power transferred by the DC transmission part 140 into three-phase AC power.

The demand-side transformer part 160 isolates the demand-side AC part 170 from the demand-side DC-AC converter part 150 and the DC transmission part 140.

The demand-side AC part 170 provides three-phase AC power corresponding to an output of the demand-side transformer part 160 to the demand part 180.

The control part 190 controls at least one of the power generation part 101, the transmission-side AC part 110, the transmission-side transformation part 103, the DC transmission part 140, the demand-side transformation part 105, the demand-side AC part 170, the demand part 180, the control part 190, the transmission-side AC-DC converter part 130, and the demand-side DC-AC converter part 150. In particular, the control part 190 may control turning-on or turning-off timings of a plurality of valves in the transmission-side AC-DC converter part 130 and the demand-side DC-AC converter part 150. Here, the valves may correspond to a thyristor or an insulated gate bipolar transistor (IGBT).

The control part 190 according to an embodiment may estimate a power generation amount with respect to wind power generation, and may predict a possible power generation amount on the basis of the power generation amount. Furthermore, the control part 190 may predict an energy charging/discharging amount and may perform control on power generation according to the energy charging/discharging amount.

Figure 2:
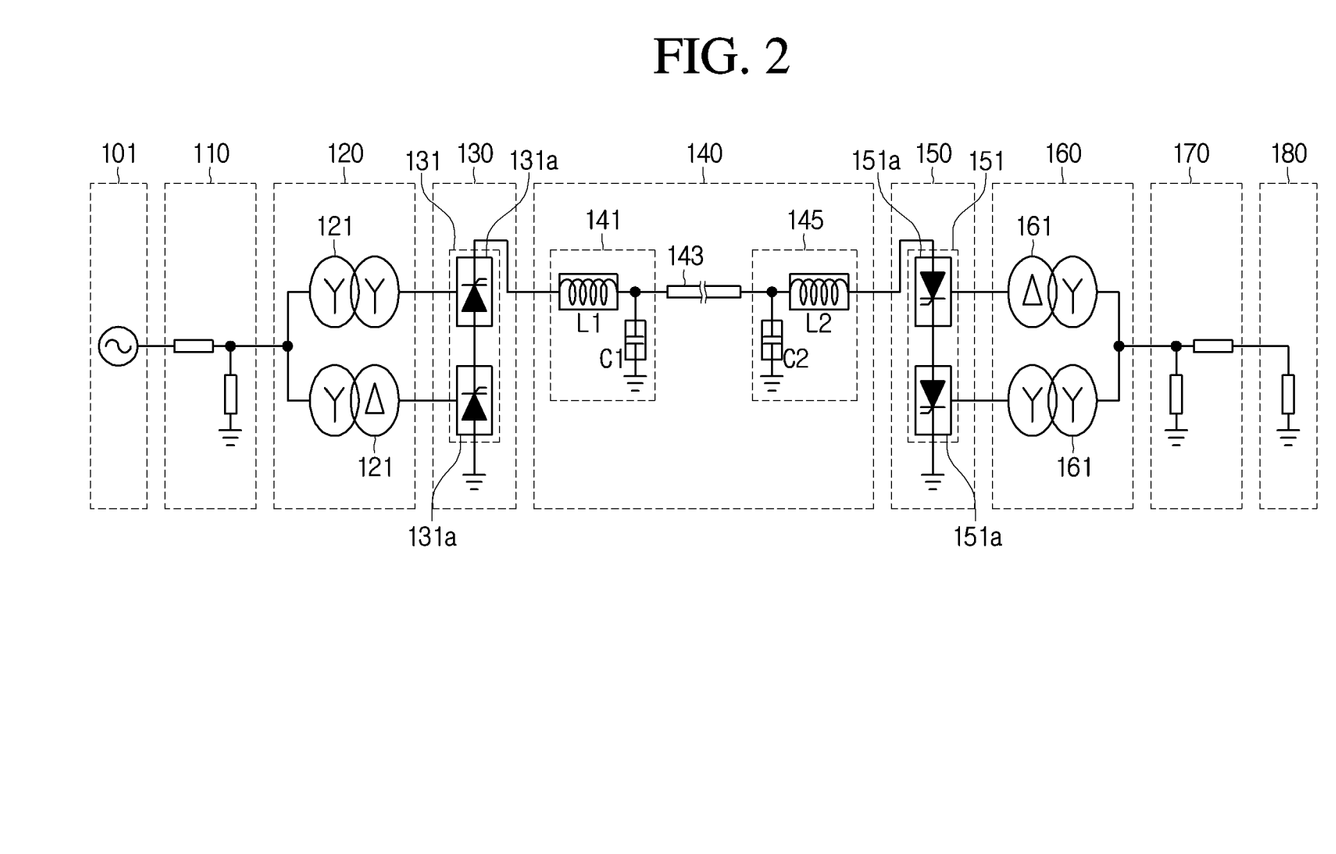
FIG. 2 is a diagram illustrating a monopolar HVDC transmission system according to an embodiment.

FIG. 2 illustrates a monopolar HVDC transmission system according to an embodiment.

In particular, FIG. 2 illustrates a single-pole DC power transmission system. It is assumed that the single pole is a positive pole in the following description, but the single pole is not limited thereto.

The transmission-side AC part 110 includes an AC transmission line 111 and an AC filter 113.

The AC transmission line 111 transfers the three-phase AC power generated by the power generation part 101 to the transmission-side transformation part 103.

The AC filter 113 removes frequency components from the three-phase AC power excepting a frequency component used by the transmission-side transformation part 103.

The transmission-side transformer part 120 includes at least one transformer 121 for a positive pole. For the positive pole, the transmission-side AC-DC converter part 130 includes an AC-positive pole DC converter 131 for generating positive pole DC power, wherein the AC-positive pole DC converter 131 includes at least one three-phase valve bridge 131a corresponding to the at least one transformer 121 respectively.

In the case of using one three-phase valve bridge 131a, the AC-positive pole DC converter 131 may generate positive pole DC power with six pulses using AC power. Here, a primary coil and a secondary coil of the one transformer 121 may have a Y-Y connection or a Y-delta (Δ) connection.

In the case of using two three-phase valve bridges 131a, the AC-positive pole DC converter 131 may generate positive pole DC power with 12 pulses using AC power. Here, the primary coil and the secondary coil of one of the transformers 121 may have a Y-Y connection, and the primary coil and the secondary coil of the other transformer 121 may have a Y-Δ connection.

In the case of using three three-phase valve bridges 131a, the AC-positive pole DC converter 131 may generate positive pole DC power with 18 pulses using AC power. As the number of the pulses of the positive pole DC power is increased, the price of a filter may be decreased.

The DC transmission part 140 includes a transmission-side positive pole DC filter 141, a positive pole DC transmission line 143, and a demand-side positive pole DC filter 145.

The transmission-side positive pole DC filter 141 includes an inductor L1 and a capacitor C1, and DC-filters positive pole DC power output from the AC-positive pole DC converter 131.

The positive pole DC transmission line 143 has one DC line for transmitting positive pole DC power, wherein the ground may be used as a current return path. At least one switch may be disposed on the DC line.

The demand-side positive pole DC filter 145 includes an inductor L2 and a capacitor C2, and DC-filters positive pole DC power transferred through the positive pole DC transmission line 143.

The demand-side DC-AC converter part 150 includes a positive pole DC-AC converter 151, wherein the positive pole DC-AC converter 151 includes at least one three-phase valve bridge 151a.

The demand-side transformer part 160 includes at least one transformer 161 corresponding to the at least one three-phase valve bridge 151a respectively for the positive pole.

In the case of using one three-phase valve bridge 151a, the positive pole DC-AC converter 151 may generate AC power with six pulses using positive pole DC power. Here, a primary coil and a secondary coil of the one transformer 161 may have a Y-Y connection or a Y-delta (Δ) connection.

In the case of using two three-phase valve bridges 151a, the positive pole DC-AC converter 151 may generate AC power with 12 pulses using positive pole DC power. Here, the primary coil and the secondary coil of one of the transformers 161 may have a Y-Y connection, and the primary coil and the secondary coil of the other transformer 161 may have a Y-Δ connection.

In the case of using three three-phase valve bridges 151a, the positive pole DC-AC converter 151 may generate AC power with 18 pulses using positive pole DC power. As the number of the pulses of the AC power is increased, the price of a filter may be decreased.

The demand-side AC part 170 includes an AC filter 171 and an AC transmission line 173.

The AC filter 171 removes frequency components from the AC power generated by the demand-side transformation part 105, excepting a frequency component (e.g., a frequency of about 60 Hz) used by the demand part 180.

The AC transmission line 173 transfers filtered AC power to the demand part 180.

Figure 3:
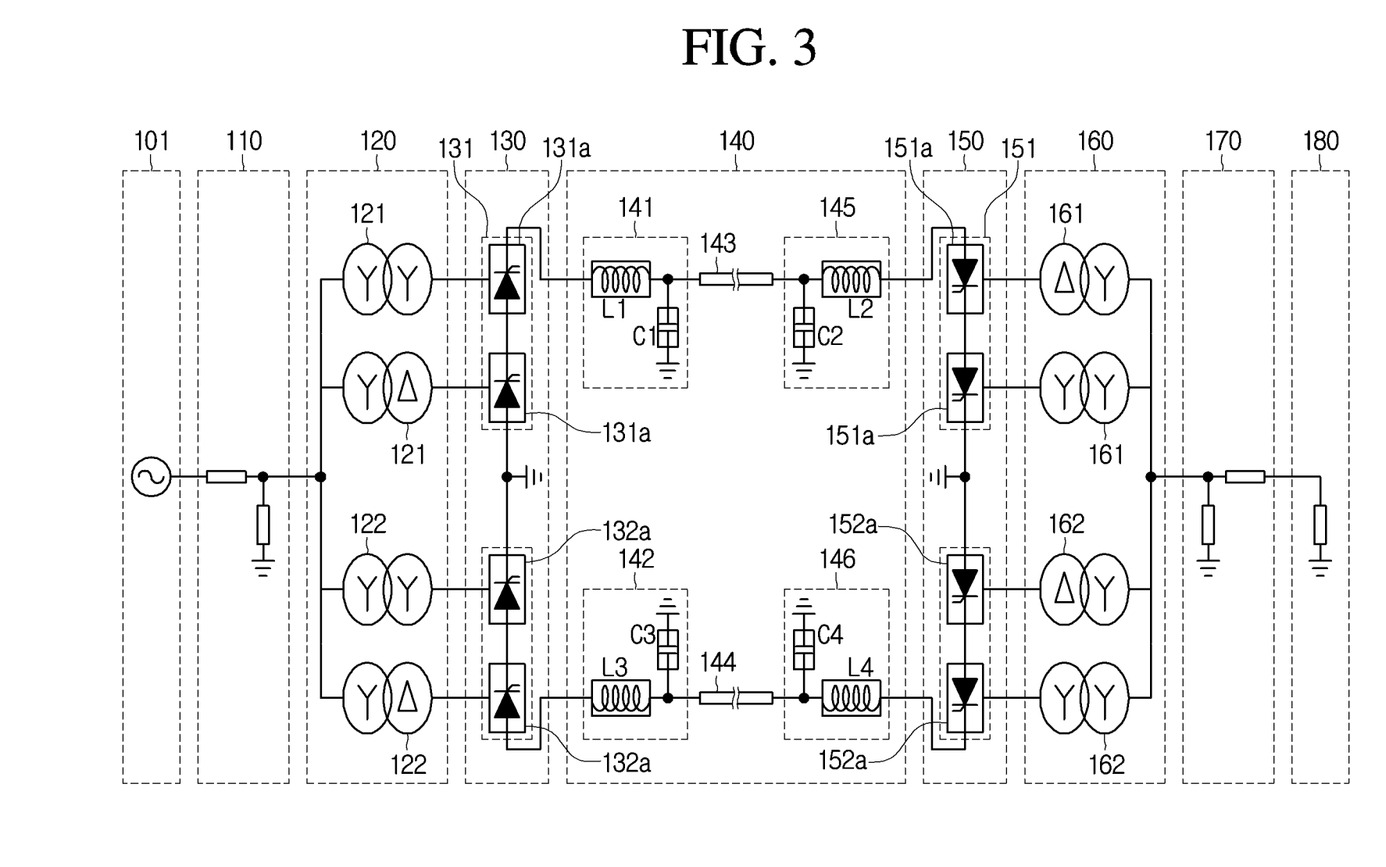
FIG. 3 is a diagram illustrating a bipolar HVDC transmission system according to an embodiment.

FIG. 3 illustrates a bipolar HVDC transmission system according to an embodiment.

In particular, FIG. 3 illustrates a system for transmitting DC power of two poles. It is assumed that the two poles are a positive pole and a negative pole in the following description, but the two poles are not limited thereto.

The transmission-side AC part 110 includes the AC transmission line 111 and the AC filter 113.

The AC transmission line 111 transfers the three-phase AC power generated by the power generation part 101 to the transmission-side transformation part 103.

The AC filter 113 removes frequency components from the three-phase AC power excepting a frequency component used by the transmission-side transformation part 103.

The transmission-side transformer part 120 includes at least one transformer 121 for a positive pole and at least one transformer 122 for a negative pole. The transmission-side AC-DC converter part 130 includes the AC-positive pole DC converter 131 for generating positive pole DC power and an AC-negative pole DC converter 132 for generating negative pole DC power, wherein the AC-positive pole DC converter 131 includes at least one three-phase valve bridge 131*a* respectively corresponding to the at least one transformer 121 for the positive pole, and the AC-negative pole DC converter 132 includes at least one three-phase valve bridge 132*a* respectively corresponding to the at least one transformer 122 for the negative pole.

In the case of using one three-phase valve bridge 131*a* for the positive pole, the AC-positive pole DC converter 131 may generate positive pole DC power with six pulses using AC power. Here, the primary coil and the secondary coil of the one transformer 121 may have a Y-Y connection or a Y-delta ($\Delta$) connection.

In the case of using two three-phase valve bridges 131*a* for the positive pole, the AC-positive pole DC converter 131 may generate positive pole DC power with 12 pulses using AC power. Here, the primary coil and the secondary coil of one of the transformers 121 may have a Y-Y connection, and the primary coil and the secondary coil of the other transformer 121 may have a Y-$\Delta$ connection.

In the case of using three three-phase valve bridges 131*a* for the positive pole, the AC-positive pole DC converter 131 may generate positive pole DC power with 18 pulses using AC power. As the number of the pulses of the positive pole DC power is increased, the price of a filter may be decreased.

In the case of using one three-phase valve bridge 132*a* for the negative pole, the AC-negative pole DC converter 132 may generate negative pole DC power with six pulses. Here, a primary coil and a secondary coil of the one transformer 122 may have a Y-Y connection or a Y-delta ($\Delta$) connection.

In the case of using two three-phase valve bridges 132*a* for the negative pole, the AC-negative pole DC converter 132 may generate negative pole DC power with 12 pulses. Here, the primary coil and the secondary coil of one of the transformers 122 may have a Y-Y connection, and the primary coil and the secondary coil of the other transformer 122 may have a Y-$\Delta$ connection.

In the case of using three three-phase valve bridges 132*a* for the negative pole, the AC-negative pole DC converter 132 may generate negative pole DC power with 18 pulses. As the number of the pulses of the negative pole DC power is increased, the price of a filter may be decreased.

The DC transmission part 140 includes the transmission-side positive pole DC filter 141, a transmission-side negative pole DC filter 142, the positive pole DC transmission line 143, a negative pole DC transmission line 144, the demand-side positive pole DC filter 145, and a demand-side negative pole DC filter 146.

The transmission-side positive pole DC filter 141 includes the inductor L1 and the capacitor C1, and DC-filters positive pole DC power output from the AC-positive pole DC converter 131.

The transmission-side negative pole DC filter 142 includes an inductor L3 and a capacitor C3, and DC-filters negative pole DC power output from the AC-negative pole DC converter 132.

The positive pole DC transmission line 143 has one DC line for transmitting positive pole DC power, wherein the ground may be used as a current return path. At least one switch may be disposed on the DC line.

The negative pole DC transmission line 144 has one DC line for transmitting negative pole DC power, wherein the ground may be used as a current return path. At least one switch may be disposed on the DC line.

The demand-side positive pole DC filter 145 includes the inductor L2 and the capacitor C2, and DC-filters positive pole DC power transferred through the positive pole DC transmission line 143.

The demand-side negative pole DC filter 146 includes an inductor L4 and a capacitor C4, and DC-filters negative pole DC power transferred through the negative pole DC transmission line 144.

The demand-side DC-AC converter part 150 includes the positive pole DC-AC converter 151 and a negative pole DC-AC converter 152, wherein the positive pole DC-AC converter 151 includes at least one three-phase valve bridge 151*a*, and the negative pole DC-AC converter 152 includes at least one three-phase valve bridge 152*a*.

The demand-side transformer part 160 includes at least one transformer 161 respectively corresponding to the at least one three-phase valve bridge 151*a* for the positive pole, and includes at least one transformer 162 respectively corresponding to the at least one three-phase valve bridge 152*a* for the negative pole.

In the case of using one three-phase valve bridge 151*a* for the positive pole, the positive pole DC-AC converter 151 may generate AC power with six pulses using positive pole DC power. Here, the primary coil and the secondary coil of the one transformer 161 may have a Y-Y connection or a Y-delta ($\Delta$) connection.

In the case of using two three-phase valve bridges 151*a* for the positive pole, the positive pole DC-AC converter 151 may generate AC power with 12 pulses using positive pole DC power. Here, the primary coil and the secondary coil of one of the transformers 161 may have a Y-Y connection, and the primary coil and the secondary coil of the other transformer 161 may have a Y-$\Delta$ connection.

In the case of using three three-phase valve bridges 151*a* for the positive pole, the positive pole DC-AC converter 151 may generate AC power with 18 pulses using positive pole DC power. As the number of the pulses of the AC power is increased, the price of a filter may be decreased.

In the case of using one three-phase valve bridge 152*a* for the negative pole, the negative pole DC-AC converter 152 may generate AC power with six pulses using negative pole DC power. Here, the primary coil and the secondary coil of the one transformer 162 may have a Y-Y connection or a Y-delta ($\Delta$) connection.

In the case of using two three-phase valve bridges 152*a* for the negative pole, the negative pole DC-AC converter 152 may generate AC power with 12 pulses using negative pole DC power. Here, the primary coil and the secondary coil of one of the transformers 162 may have a Y-Y connection, and the primary coil and the secondary coil of the other transformer 162 may have a Y-$\Delta$ connection.

In the case of using three three-phase valve bridges 152*a* for the negative pole, the negative pole DC-AC converter 152 may generate AC power with 18 pulses using negative pole DC power. As the number of the pulses of the AC power is increased, the price of a filter may be decreased.

The demand-side AC part 170 includes the AC filter 171 and the AC transmission line 173.

The AC filter 171 removes frequency components from the AC power generated by the demand-side transformation part 105, excepting a frequency component (e.g., a frequency of about 60 Hz) used by the demand part 180.

The AC transmission line 173 transfers filtered AC power to the demand part 180.

Figure 4:
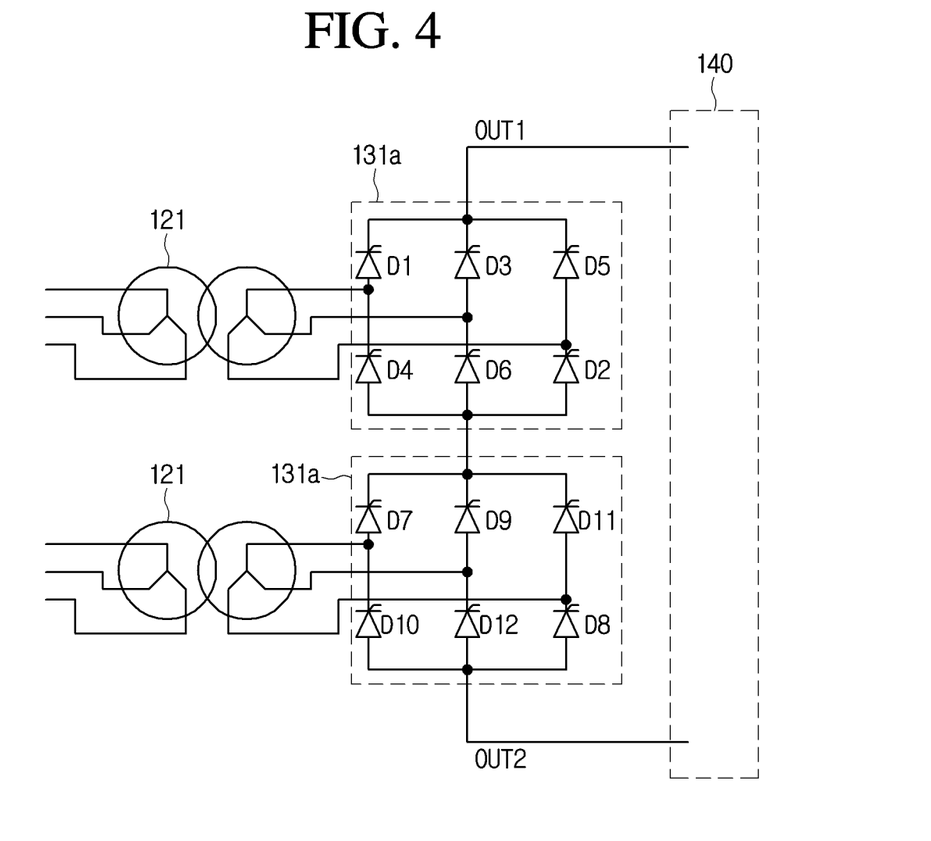
FIG. 4 is a diagram illustrating a connection of a transformer and a three-phase valve bridge according to an embodiment.

FIG. 4 illustrates a connection of a transformer and a three-phase valve bridge according to an embodiment.

In particular, FIG. 4 illustrates a connection of two transformers 121 for a positive pole and two three-phase valve bridges 131a for a positive pole. A connection of two transformers 122 for a negative pole and two three-phase valve bridges 132a for a negative pole, a connection of two transformers 161 for a positive pole and two three-phase valve bridges 151a for a positive pole, a connection of two transformers 162 for a negative pole and two three-phase valve bridges 152a for a negative pole, a connection of one transfer 121 for a positive pole and one three-phase valve bridge 131a for a positive pole, a connection of one transformer 161 for a positive pole and one three-phase valve bridge 151a for a positive pole, and the like could be easily derived from the example of FIG. 4, and are thus not described in detail.

In FIG. 4, the transformer 121 having a Y-Y connection is referred to as an upper transformer, the transformer 121 having a Y-Δ connection is referred to as a lower transformer, the three-phase valve bridge 131a connected to the upper transformer is referred to as an upper three-phase valve bridge, and the three-phase valve bridge 131a connected to the lower transformer is referred to as a lower three-phase valve bridge.

The upper three-phase valve bridge and the lower three-phase valve bridge have two output terminals for outputting DC power, i.e., a first output terminal OUT1 and a second output terminal OUT2.

The upper three-phase valve bridge includes six valves D1 to D6, and the lower three-phase valve bridge includes six valves D7 to D12.

The valve D1 has a cathode connected to the first output terminal OUT1 and an anode connected to a first terminal of the secondary coil of the upper transformer.

The valve D2 has a cathode connected to an anode of the valve D5 and an anode connected to an anode of the valve D6.

The valve D3 has a cathode connected to the first output terminal OUT1 and an anode connected to a second terminal of the secondary coil of the upper transformer.

The valve D4 has a cathode connected to the anode of the valve D1 and an anode connected to the anode of the valve D6.

The valve D5 has a cathode connected to the first output terminal OUT1 and the anode connected to a third terminal of the secondary coil of the upper transformer.

The valve D6 has a cathode connected to the anode of the valve D3.

The valve D7 has a cathode connected to the anode of the valve D6 and an anode connected to a first terminal of the secondary coil of the lower transformer.

The valve D8 has a cathode connected to an anode of the valve D11 and an anode connected to the second output terminal OUT2.

The valve D9 has a cathode connected to the anode of the valve D6 and an anode connected to a second terminal of the secondary coil of the lower transformer.

The valve D10 has a cathode connected to the anode of the valve D7 and an anode connected to the second output terminal OUT2.

The valve D11 has a cathode connected to the anode of the valve D6 and the anode connected to a third terminal of the secondary coil of the lower transformer.

The valve D12 has a cathode connected to the anode of the valve D9 and an anode connected to the second output terminal OUT2.

Figure 5:
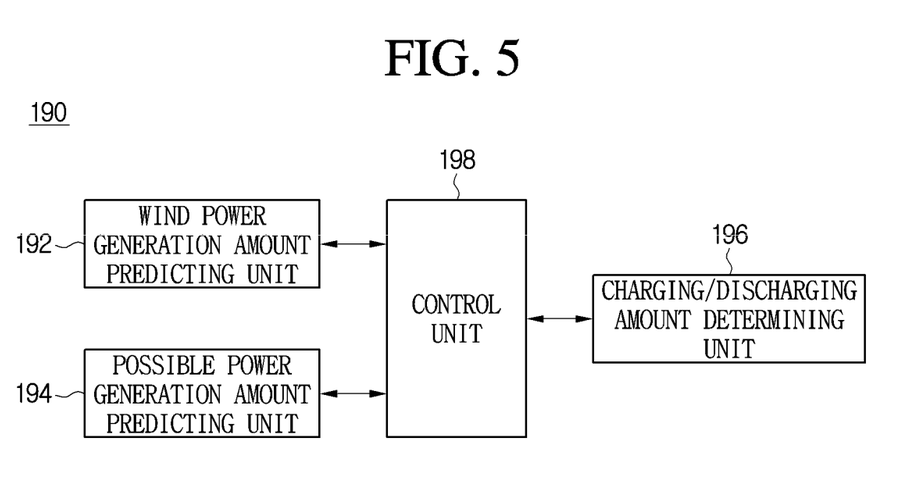
FIG. 5 is a block diagram illustrating a control part of an HVDC transmission system according to an embodiment.

FIG. 5 is a block diagram illustrating a control part of an HVDC transmission system according to an embodiment.

Referring to FIG. 5, the control part 190 according to an embodiment may include a wind power generation amount predicting unit 192, a possible power generation amount predicting unit 194, a charging/discharging amount determining unit 196, and a control unit 198.

The wind power generation amount predicting unit 192 may predict a wind power generation amount for a predetermined time. The wind power generation amount predicting unit 192 may acquire electric energy generated by a wind power generation device and affected by a wind direction and a wind speed, and may predict the wind power generation amount.

The possible power generation amount predicting unit 194 may predict an amount of electric energy able to be generated for a predetermined time (or period) on the basis of electric energy generated from the wind power generation amount predicted by the wind power generation predicting unit 192. The possible power generation amount predicting unit may determine a transmission capacity according to the predicted electric energy amount.

The charging/discharging amount determining unit 196 may determine a charging amount and a discharging amount of an energy storage device on the basis of the transmission capacity and the possible power generation amount predicted by the possible power generation amount predicting unit 194.

The control unit 198 may detect an AC voltage and current applied from the transmission-side AC part 110 and may control the wind power generation amount predicting unit 192 so that the wind power generation amount is predicted (or calculated). The AC voltage and current used for predicting the wind power generation amount may be values for electric energy generated by operating the wind power generation device so that a generator connected to a rotating shaft is rotated by rotating a blade with wind power energy.

It has been exemplarily illustrated that the wind power generation amount predicting unit 192, the possible power generation amount predicting unit 194, and the charging/discharging amount determining unit 196 are separate from the control unit 198. The foregoing elements may be integrated with the control unit 198 as one device. A configuration of the above-mentioned device is not limited and may be variable according to a configuring method.

Figure 6:
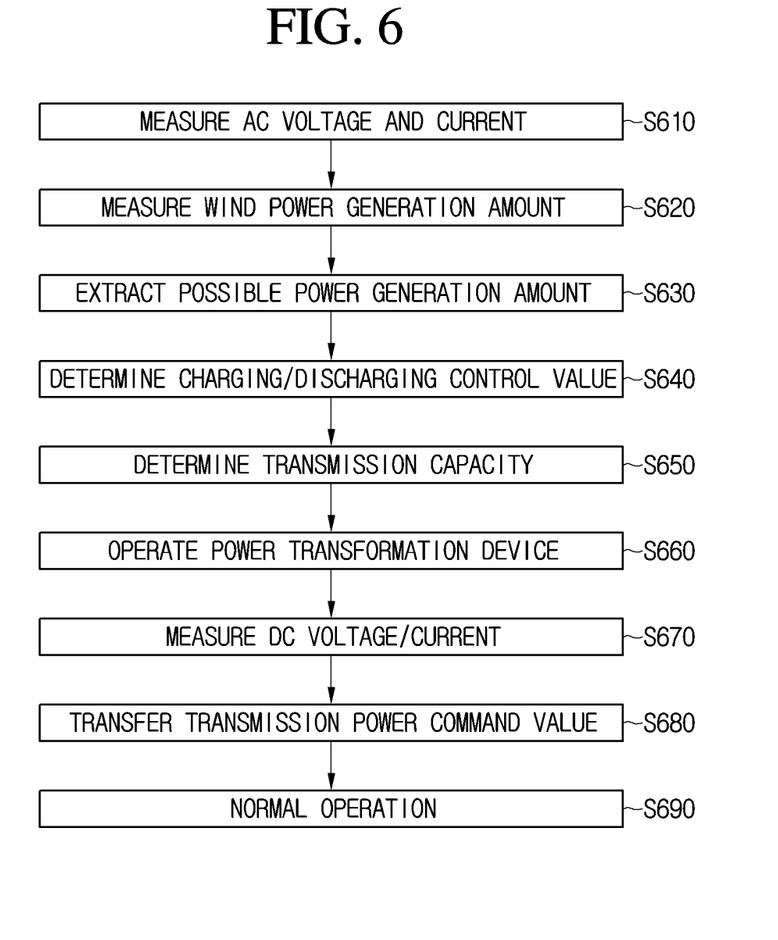
FIG. 6 is a flowchart illustrating a control operation of an HVDC transmission system according to an embodiment.

FIG. 6 is a flowchart illustrating a control operation of an HVDC transmission system according to an embodiment.

Referring to FIG. 6, the control unit 198 according to an embodiment may measure an AC voltage and current applied from the transmission-side AC part 110 (S610).

The control unit 198 may control the wind power generation amount predicting unit 192 so that the wind power generation amount is predicted on the basis of the measured AC voltage and current. That is, an amount of wind power generation of the wind power generation device is measured (S620), and, on the basis of a time at which the measured amount of wind power generation is collected, the wind power generation amount may be calculated. Therefore, the control unit 198 may control the possible power generation amount predicting unit 194 so that the possible power generation amount is extracted according to the wind power generation amount collected for a predetermined time (S630).

The control unit 198 may determine the charging/discharging amount of the energy storage device on the basis of the possible power generation amount (S640). In detail, the control unit 198 may determine the charging/discharging amount of the energy storage device in consideration of the transmission capacity for a predetermined time (or period) using the charging/discharging amount determining unit 196 (S640).

When a charging/discharging control value is determined, the control unit 198 may determine the transmission capacity for transmitting energy to be stored in the energy storage device (S650). That is, the control unit 198 may determine the charging/discharging amount of the energy storage device on the basis of the possible power generation amount so that the transmission capacity is constant for a predetermined time or varies for each time point, and may determine a capacity for transmitting power for a predetermined time (or period) according to the determined charging/discharging amount.

The control unit 198 may output energy stored in the energy storage device according to the determined transmission capacity so as to check operation of a power transformation device (S660).

The control unit 198 may measure a DC voltage and current output according to the operation of the power transformation device (S670), and may determine whether the measured voltage and current values fall within reference voltage and current value ranges so as to determine whether the power transformation device is operated normally.

The control unit 198 may check a transmission power command value (operating power amount) according to the DC voltage and current output according to the operation of the power transformation device (S680). In detail, the control unit 198 may check an amount of power according to the measured DC voltage and current, and may determine whether the power transformation device is operated normally according to the amount of power.

Therefore, the control unit 198 may determine whether the power transformation device is operated normally on the basis of the checked amount of transmission power (S690).

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A high-voltage direct current (HVDC) transmission system control device comprising:
    a first predicting unit configured to receive energy generated by a wind power generation device for a predetermined time and predict an amount of generated wind power based on the received energy;
    a second predicting unit configured to determine an amount of energy generated by the wind power generation device and a transmission capacity corresponding to the determined amount of energy based on the predicted amount of generated wind power;
    a determining unit configured to determine an amount of energy charged and discharged by a storage device based on the determined amount of energy and the corresponding transmission capacity; and
    a control unit configured to output energy to a power device based on the determined amount of energy and the corresponding transmission capacity,
    wherein the determining unit is further configured to determine the amount of energy charged and discharged based on a possible power generation amount such that the corresponding transmission capacity is constant for a predetermined time or varies for each of a plurality of time points and to determine a capacity for transmitting power for a predetermined time according to the determined amount of energy charged and discharged,
    wherein the power device is configured to receive energy output by the storage device and output a DC voltage and current corresponding to an amount of energy output by the storage device, and
    wherein the control unit is further configured to:
        measure the DC voltage and current output by the power device;
        determine whether the measured DC voltage and current are within reference voltage and current ranges in order to determine whether the power device operates normally; and
        determine whether the power device operates normally based on the measured DC voltage and current output.

2. The HVDC transmission system control device according to claim 1, wherein the first predicting unit is further configured to measure AC voltage and current from a transmission-side AC part.

3. The HVDC transmission system control device according to claim 2, wherein the first predicting unit is further configured to predict the amount of generated wind power based on the measured AC voltage and current.

* * * * *